US012789594B2

(12) United States Patent
Hatta et al.

(10) Patent No.: US 12,789,594 B2
(45) Date of Patent: Nov. 10, 2026

(54) WINDOW GLASS FOR VEHICLE WINDOW

(71) Applicant: AGC Inc., Tokyo (JP)

(72) Inventors: Naonori Hatta, Tokyo (JP); Chihiro Kato, Tokyo (JP)

(73) Assignee: AGC INC., Tokyo (JP)

(*) Notice: Subject to any disclaimer, the term of this patent is extended or adjusted under 35 U.S.C. 154(b) by 223 days.

(21) Appl. No.: 18/890,674

(22) Filed: Sep. 19, 2024

(65) Prior Publication Data

US 2025/0010694 A1 Jan. 9, 2025

Related U.S. Application Data

(63) Continuation of application No. PCT/JP2023/011067, filed on Mar. 22, 2023.

(30) Foreign Application Priority Data

Mar. 23, 2022 (JP) ................................ 2022-047424

(51) Int. Cl.
*B60J 1/10* (2006.01)
*B60J 1/00* (2006.01)
*B60R 13/04* (2006.01)

(52) U.S. Cl.
CPC ................ *B60J 1/10* (2013.01); *B60J 1/004* (2013.01); *B60R 13/04* (2013.01)

(58) Field of Classification Search
CPC .................................... B60J 1/085; B60J 1/10
See application file for complete search history.

(56) References Cited

U.S. PATENT DOCUMENTS 10,119,323 B2 * 11/2018 Lahnala .................. B60J 10/36
12,330,480 B2 * 6/2025 Kong ...................... B60J 1/004
12,351,006 B2 * 7/2025 Kawashima ............ B60J 1/006

FOREIGN PATENT DOCUMENTS

JP 2014-091362 A 5/2014

OTHER PUBLICATIONS

International Searching Authority, "International Search Report," issued in connection with International Patent Application No. PCT/JP2023/011067, dated Jun. 6, 2023.
International Searching Authority, "Written Opinion," issued in connection with International Patent Application No. PCT/JP2023/011067, dated Jun. 6, 2023.

* cited by examiner

*Primary Examiner* — Nicholas McFall
(74) *Attorney, Agent, or Firm* — Foley & Lardner LLP

(57) ABSTRACT

To provide a window glass for a vehicle window, capable of suppressing generation of sink marks in a resin molding while securing the design property of a design member. A window glass for a vehicle window according to the present disclosure includes a glass plate; and a resin molding provided in a peripheral edge portion of the glass plate. The glass plate and the resin molding constitute an integrated article. The window glass for a vehicle window further includes a design member that covers a corner of the resin molding. The design member is arranged at a vehicle outside of the resin molding when the window glass for a vehicle window is attached to a vehicle. The corner has a sharp angle. An insert member or a gas bubble portion is provided inside the corner of the resin molding.

10 Claims, 8 Drawing Sheets

WINDOW GLASS FOR VEHICLE WINDOW

INCORPORATION BY REFERENCE

This application is based upon and claims the benefit of priority from Japanese patent application No. 2022-047424, filed on Mar. 23, 2022, and PCT application No. PCT/JP2023/011067 filed on Mar. 22, 2023, the disclosure of which is incorporated herein in its entirety by reference.

BACKGROUND

The present disclosure relates to a window glass for a vehicle window.

A plate-shaped body for a vehicle window having a frame body, disclosed in Japanese Unexamined Patent Application Publication No. 2014-091362, includes a plate-shaped body for a window that is installed to a vehicle window frame, a frame body made of synthetic resin that is attached to a peripheral edge portion of the plate-shaped body for a window, and a decorative member attached to the frame body. The frame body includes at least one sharp-shaped corner portion in a plan view. The sharp-shaped corner portion includes a sharp-shaped portion that is in contact with sharp-shaped end surfaces of at least two decorative members.

SUMMARY

Inventors of the present invention found a following issue.

In order to secure a design property, the inventors of the present invention devised and examined a window glass for a vehicle window including a corner that was formed by using one design member and a resin molding. However, when one design member was formed by processing one material, cracking or distortion occurs due to the shape of the corner, which compromises the design property of the design member.

For example, a resin molding 92 is arranged in a corner 91_a_ of a glass plate 91 of a window glass for a vehicle window 90 shown in FIGS. 6 and 7. Part of the resin molding 92 is covered with one design member 93. The corner 91_a_ has a sharp angle. The one design member 93 is shaped into the shape according to the angle of the corner 91_a_. However, the shaping causes cracking or distortion in an inner edge portion 93_a_ of the design member 93, which compromises the design property of the design member 93.

On the other hand, when one design member was formed by processing a single material with the inner edge portion of the corner being shortened, occurrence of such cracking and distortion could be suppressed, though undesirable recesses (sink marks) were sometimes generated on the surface of the resin molding due to shrinkage of the resin molding during hardening in the resin molding.

For example, there is a window glass for a vehicle window 190 shown in FIG. 8. The window glass for a vehicle window 190 includes the same configuration as the window glass for a vehicle window 90 except for the design member 193. An inner edge portion 193_a_ of the design member 193 is shorter than the inner edge portion 93_a_ of the design member 93 shown in FIG. 7. Therefore, when the design member 193 is shaped, cracking or distortion rarely occur at the inner edge portion 193_a_. However, sink marks were sometimes generated in the resin molding 92 and more specifically on the surface of a region 92_a_ in the vicinity of the inner edge portion 193_a_.

The present disclosure has been made in view of the above-stated issue and is intended to provide a window glass for a vehicle window, capable of suppressing generation of sink marks in a resin molding while securing the design property of a design member.

A window glass for a vehicle window according to the present disclosure, including: a glass plate; and a resin molding provided in a peripheral edge portion of the glass plate, the glass plate and the resin molding constituting an integrated article, the window glass for a vehicle window further including a design member that covers a corner of the resin molding, in which the design member is arranged at a vehicle outside of the resin molding when the window glass for a vehicle window is attached to a vehicle, the corner has a sharp angle, and an insert member or a gas bubble portion is provided inside the corner of the resin molding.

The design member may include an inner edge portion extending toward the glass plate and inserted into the resin molding, the resin molding may include a main body that is arranged more outside of the corner of the resin molding than the inner edge portion and is covered with the design member, and an exposed portion that is arranged more inside of the corner of the resin molding than the inner edge portion and is exposed, and a thickness of the insert member or a diameter of the gas bubble portion may be larger than a distance from the glass plate to the inner edge portion of the design member.

The thickness of the insert member or the diameter of the gas bubble portion may be larger than a thickness of the exposed portion.

The glass plate may include a first straight portion, a second straight portion, and a corner formed by intersection of the first straight portion and the second straight portion, the exposed portion of the resin molding may include a first extension portion extending from one end of the corner of the glass plate toward the first straight portion, and a second extension portion extending from another end of the corner of the glass plate toward the second straight portion, and a length of the first extension portion extending from the one end of the corner of the glass plate toward the first straight portion and a length of the second extension portion extending from the another end of the corner of the glass plate toward the second straight portion may be 20 mm to 40 mm.

The insert member may be arranged on the glass plate and wrap a tip of the corner of the glass plate.

The gas bubble portion may be provided inside the main body of the resin molding.

The insert member may include polyvinyl chloride or polypropylene.

The gas bubble portion may include nitrogen gas.

The glass plate, the resin molding, and the insert member may constitute an integrated article, or the glass plate, the resin molding, and the gas bubble portion may constitute an integrated article.

The glass plate, the resin molding, the design member, and the insert member may constitute an integrated article, or the glass plate, the resin molding, the design member, and the gas bubble portion may constitute an integrated article.

The present disclosure can provide a window glass for a vehicle window, capable of suppressing generation of sink marks in a resin molding while securing the design property of the design member.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments to which the present invention is applied are described in detail with reference to the drawings. However, the present invention is not limited to the following embodiments. For clear understanding, following descriptions and drawings are simplified as appropriate.

First Embodiment

Figure 1:
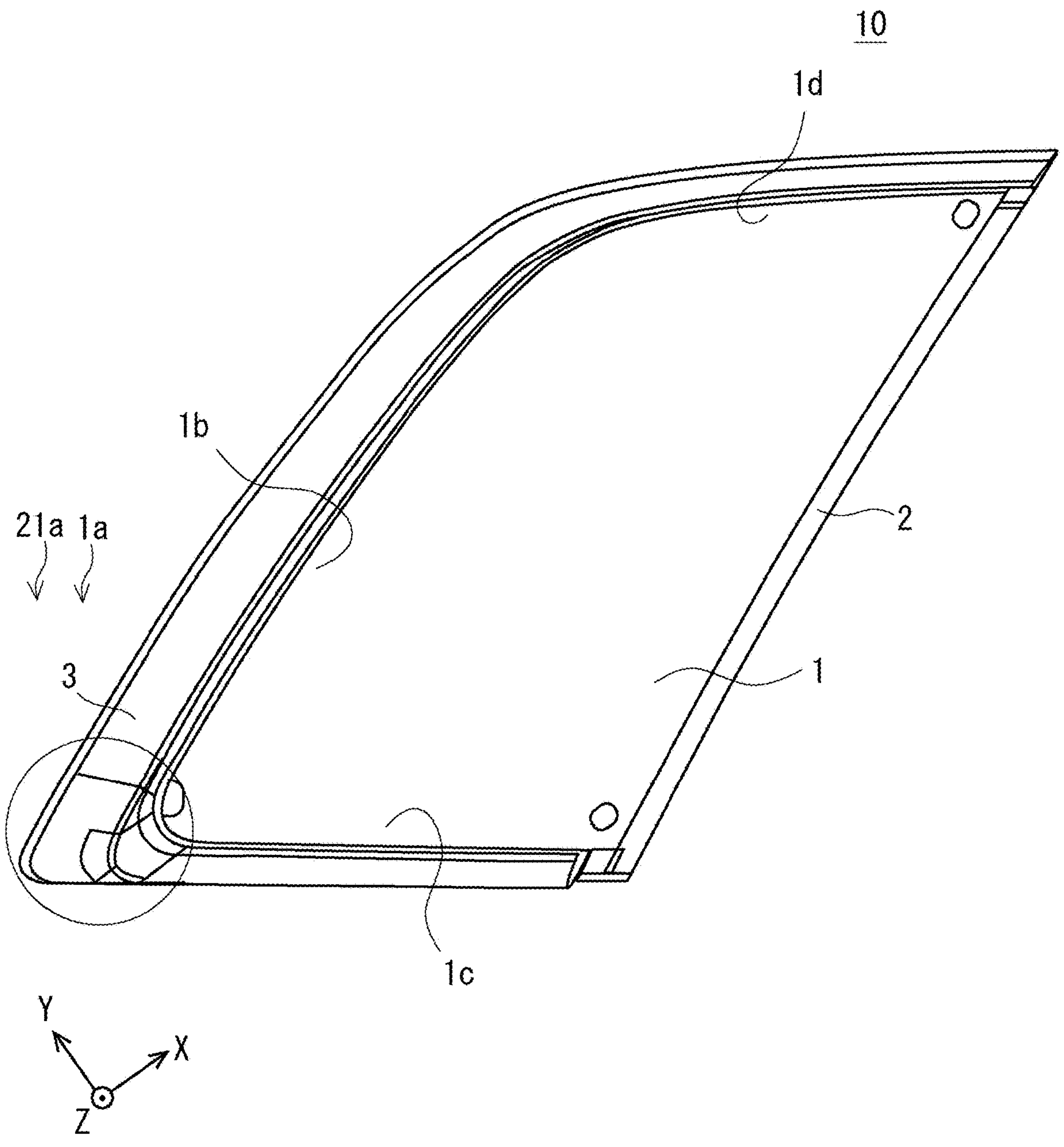
FIG. 1 is a front view of one configuration example of a window glass for a vehicle window according to a first embodiment.
Figure 2:
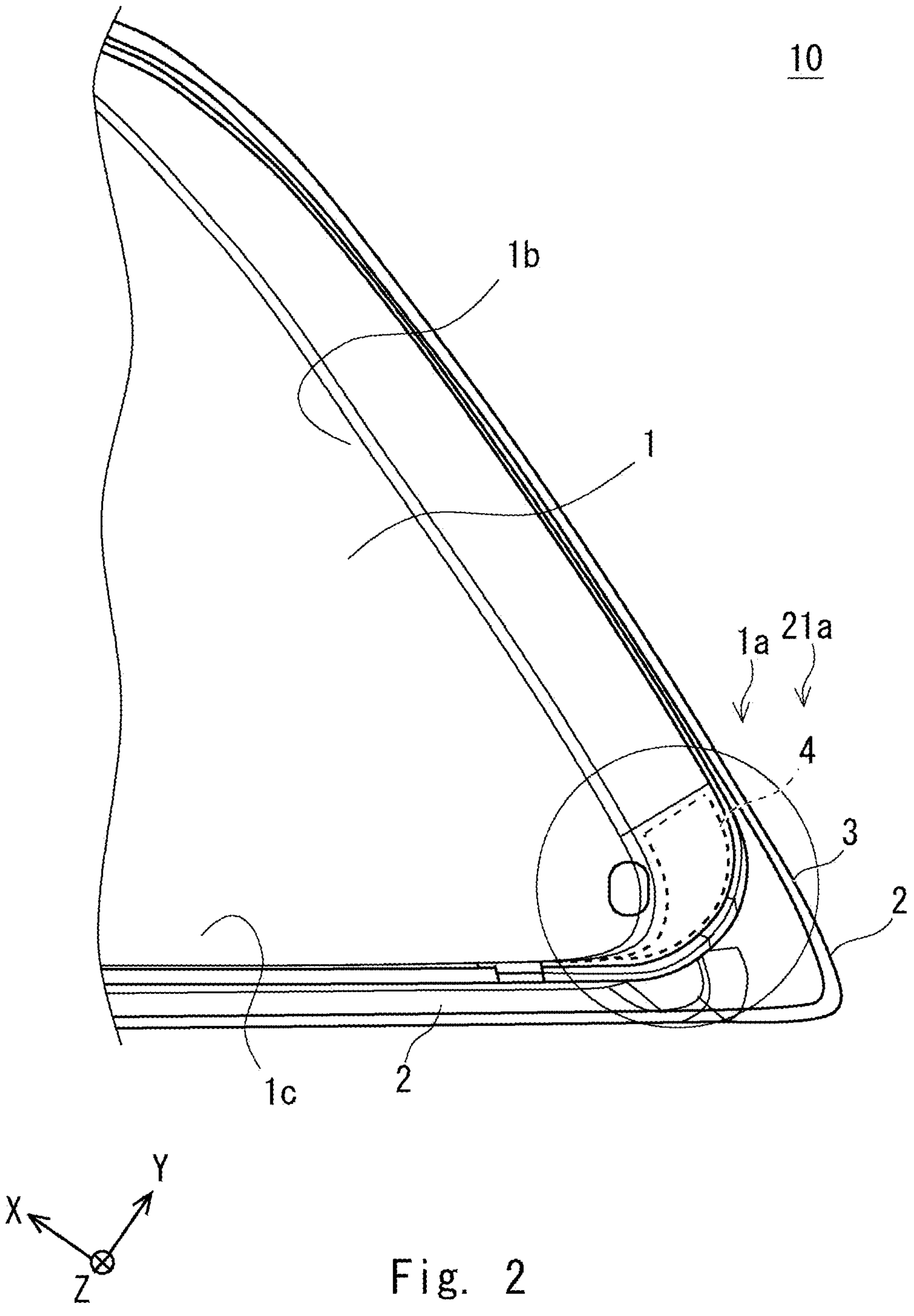
FIG. 2 is a rear view of primary components in the one configuration example of the window glass for a vehicle window according to the first embodiment.
Figure 3:
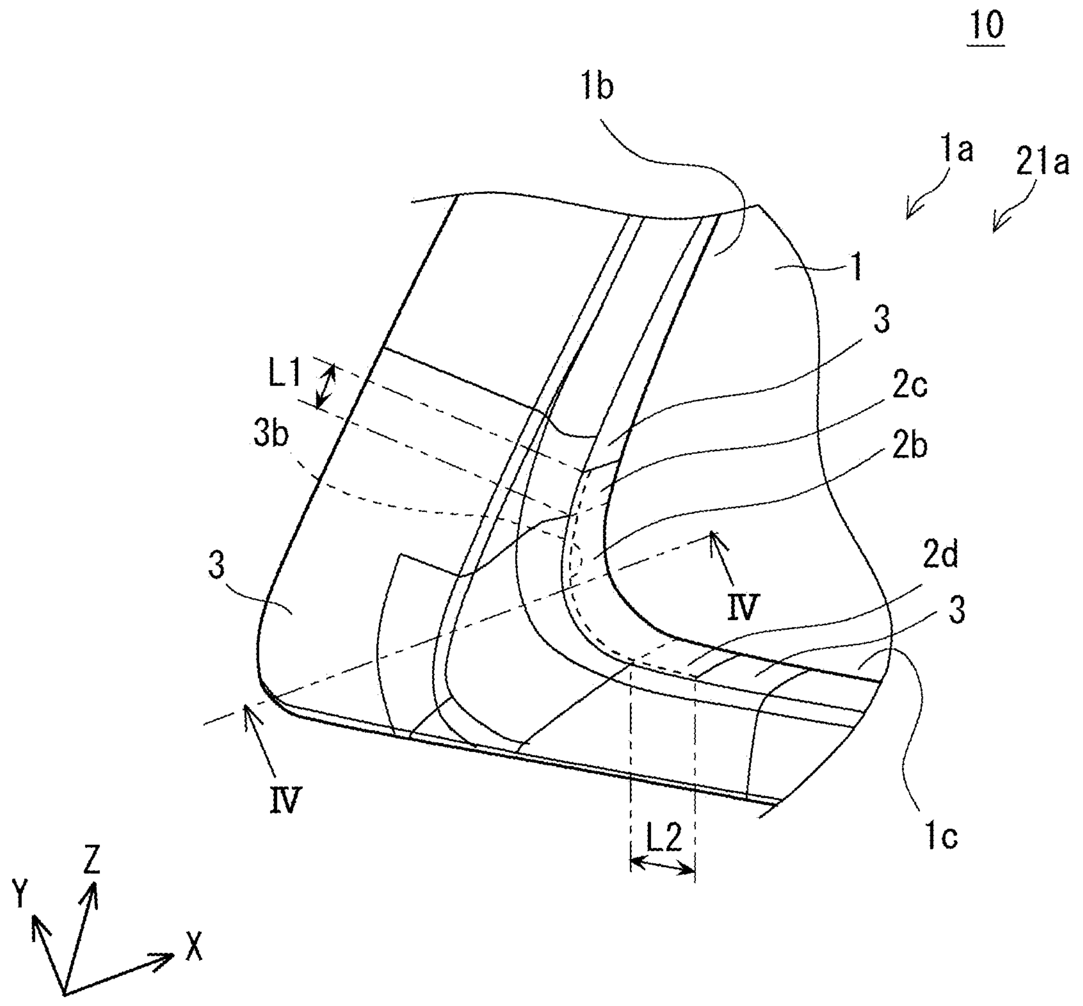
FIG. 3 is a perspective view of the one configuration example of the window glass for a vehicle window according to the first embodiment.
Figure 4:
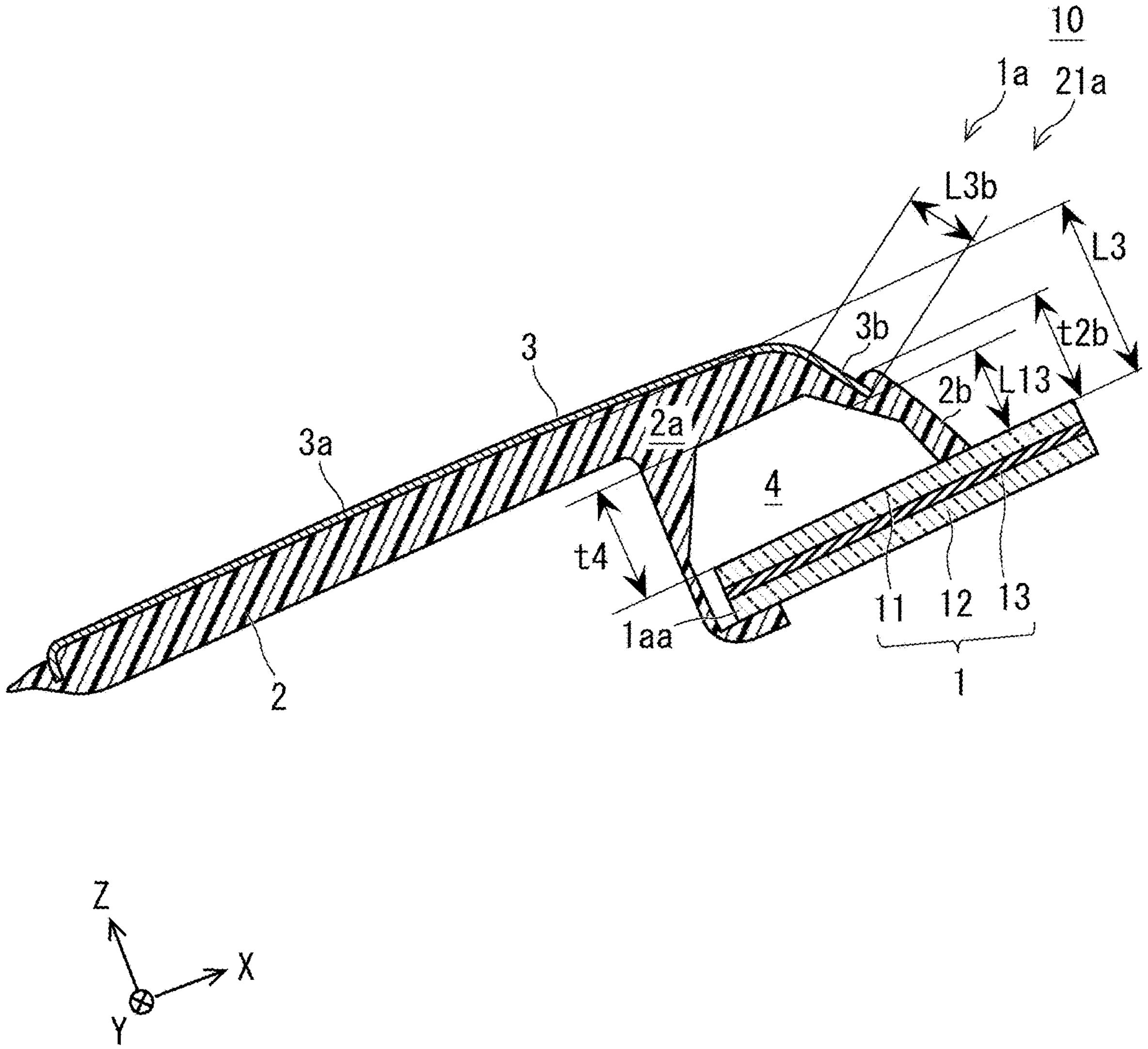
FIG. 4 is a sectional view of a corner taken along a cut line IV-IV in the one configuration example of the window glass for a vehicle window according to the first embodiment.

A first embodiment is described with reference to FIGS. 1 to 4. FIG. 1 is a front view of one configuration example of a window glass for a vehicle window according to the first embodiment. FIG. 2 is a rear view of primary components in the one configuration example of the window glass for a vehicle window shown in FIG. 1. FIG. 3 is a perspective view of a corner in the one configuration example of the window glass for a vehicle window shown in FIG. 1. FIG. 4 is a sectional view of the corner taken along a cut line IV-IV in the one configuration example of the window glass for a vehicle window shown in FIG. 3.

It is naturally understood that right-handed xyz coordinates shown in FIG. 1 and other drawings are for convenience of describing the positional relationship of component members. In general, an x-axis positive direction is inside the corner of a vehicle window glass, a z-axis positive direction is outside the vehicle, and an xy plane is a horizontal plane, which are common among the drawings.

As shown in FIGS. 1 and 2, a window glass for a vehicle window 10 includes a glass plate 1 and a resin molding 2. The glass plate 1 and the resin molding 2 constitute an integrated article. Such a window glass for a vehicle window is also called Module Assy Window (MAW: registered trademark). The window glass for a vehicle window 10 according to the first embodiment is a window glass for a vehicle window used for a fixed window of a vehicle, and is suitably used, for example, for the fixed window, such as a vehicle front quarter glass and a vehicle rear quarter glass. The window glass for a vehicle window 10 further includes a design member 3 and an insert member 4. The design member 3 is arranged at a vehicle outside of the resin molding 2 (in the z-axis positive direction in this case) when the window glass for a vehicle window 10 is attached to the vehicle.

In the window glass for a vehicle window 10 shown in FIG. 1, the glass plate 1 is formed into a substantially rectangular shape (trapezoidal shape) in a plan view. However, the shape of the glass plate 1 is not limited to the substantially rectangular shape and may be a substantially triangular shape, as long as a corner 1*a* is provided. The corner 1*a* has a sharp angle of more than 0 (zero)° and less than 90°. The glass plate 1 may be inorganic glass or organic glass. Examples of the inorganic glass include soda-lime glass, aluminosilicate glass, borosilicate glass, alkali-free glass, and quartz glass, which are used without particular restrictions. Among these, the soda-lime glass is particularly preferable in terms of production cost and easiness of shaping. The shaping method of the glass plate 1 is not particularly limited. For example, in the case of the inorganic glass, glass plates shaped by a float process or the like are preferable.

When the glass plate 1 is the inorganic glass, the glass plate 1 may be any one of untempered glass and tempered glass. The untempered glass is molten glass shaped into a plate shape and cooled down slowly. The tempered glass, which is made by forming a compressive stress layer on the surface of untempered glass, may be any one of air-cooled tempered glass or chemical tempered glass.

When the tempered glass is a physical tempered glass (for example, air-cooled tempered glass), the glass surface may be tempered by causing a compressive stress layer to be generated on the glass surface due to a temperature difference between the glass surface and the glass inside, through operations, other than slow cooling, such as the glass plate heated uniformly in bending being rapidly cooled from the temperature around a softening point. When the tempered glass is the chemical tempered glass, the glass surface may be tempered by causing compressive stress to be generated on the glass surface by ion exchange or other methods after bending. As the glass plate 1, glass that absorbs ultraviolet or infrared light may be used. While the glass plate 1 is preferably transparent, a glass plate colored to such an extent that the transparency is not damaged may also be adopted.

The glass plate 1 may have a curved shape so that the vehicle outside (in the z-axis positive direction in this case) of the glass plate 1 becomes convex when the glass plate 1 is attached to the vehicle. The glass plate 1 may have a single-curved shape formed by bending in a single direction, or may have a double-curved shape formed by bending in two directions (for example, a prescribed direction and a direction orthogonal to the prescribed direction). For bending the glass plate 1, gravity bending, press bending, roller bending, or the like, is used. When the glass plate 1 is bent with a prescribed curvature, the curvature radius of the glass plate 1 may be 1000 mm to 100000 mm.

Although the glass plate 1 may be a single glass plate, the glass plate 1 may be a glass laminate formed by bonding two or more glass plates with an interlayer interposed therebetween. A specific example of the glass plate 1 shown in FIG. 4 is a glass laminate formed by bonding a glass plate 11 and a glass plate 12 with an interlayer 13 interposed therebetween. For the interlayer 13, a well-known thermoplastic resin film, such as a resin film made of polyvinyl butyral (PVB) or ethylene vinyl acetate copolymer resin (EVA), is used as an example. The interlayer 13 may be transparent or colored. There may be two or more interlayers 13.

When the glass plate 1 is a glass laminate, the thickness of the glass plate 11 positioned outside and the thickness of the glass plate 12 positioned inside when the glass plate 1 is attached to the vehicle may be the same or different. The thickness of the glass plate 11 positioned outside when the glass plate 1 is attached to the vehicle is preferably 1.0 mm or more and 3.0 mm or less. When the thickness of the glass plate 11 positioned outside is 1.0 mm or more, the glass plate 1 has a sufficient strength, such as tolerance to stone chips, whereas when the thickness is 3.0 mm or less, the mass of the glass laminate does not become too large, which is preferable in terms of vehicle fuel efficiency. The thickness of the glass plate 12 arranged inside is preferably 0.3 mm or more and 2.3 mm or less. When the thickness of the glass plate 12 positioned at the vehicle inside is 0.3 mm or more, sufficient handling performance is provided, and when the thickness is 2.3 mm or less, the mass does not become too large. When the thickness of the glass plate 11 positioned outside and the thickness of the glass plate 12 positioned inside are both 1.8 mm or less, both weight reduction and sound insulation of the glass plate 1 can preferably be achieved. Here, when the thickness of the glass plate 12 positioned inside is 1.0 mm or less, the glass plate 12 positioned inside may be a chemical tempered glass. When the glass plate 12 positioned inside may be a chemical tempered glass, it is preferable that the compressive stress value on the glass surface is 300 MPa or more and the depth of the compressive stress layer is 2 m or more.

When the glass plate 1 is a single glass plate, the glass plate 1 is preferably an air-cooled tempered glass and in this case, the thickness of the glass plate 1 is preferably 1.0 mm or more and 5.0 mm or less.

When the glass plate 1 is an organic glass, the organic glass material may include transparent resins, such as polycarbonate or acrylic resins (e.g., polymethyl methacrylate).

The glass plate 1 may include a shielding layer at a peripheral edge of the surface at the vehicle inside. The shielding layer is formed, for example, by applying a ceramic color paste including a meltable glass frit that contains black pigment, and calcining the paste. It is possible to prevent adhesives or the like applied to the glass plate 1 from deteriorating due to ultraviolet light. For the glass plate 1, various appropriate films may be formed on a primary surface of the glass plate 1 from the viewpoint of improving weather resistance or enhancing functions such as hydrophilicity and water repellency.

The resin molding 2 is provided in a peripheral edge portion of the glass plate 1. One example of the resin molding 2 shown in FIG. 1 is provided so as to surround the periphery of the glass plate 1. Examples of the material of the resin molding 2 may include synthetic resins, such as polyvinyl chloride (PVC) and thermoplastic elastomer (TPE). The resin molding 2 may be provided around the glass plate 1 by mounting the glass plate 1 and the insert member 4 to a mold having a cavity corresponding to the shape of the resin molding 2 and injecting the above synthetic resin (melted synthetic resin) into the cavity. The resin molding 2 and the insert member 4, which are integrally formed separately from the glass plate 1, may be fitted to the outer periphery of the glass plate 1.

When the resin molding 2 is obtained as an integrated article by injection molding performed around a peripheral edge portion of the glass plate 1, the window glass for a vehicle window 10 may be an integrated article made by integrally molding the glass plate 1, the resin molding 2, the design member 3, and the insert member 4. A separately prepared design member 3 may also be attached to the window glass for a vehicle window 10.

Here, the shape of the window glass for a vehicle window 10 shown in FIG. 1 is exemplary, and the shapes other than the window glass for a vehicle window 10 shown in FIG. 1 are also applicable in the first embodiment. The window glass for a vehicle window 10 may include a fixing member that fixes the window glass for a vehicle window 10 to the vehicle body as appropriate.

One configuration example of the window glass for a vehicle window 10 is further described in detail.

One example of the glass plate 1 shown in FIG. 1 includes a first straight portion 1*b*, a second straight portion 1*c*, and a third straight portion 1*d*. The corner 1*a* is formed by intersection of the first straight portion 1*b* and the second straight portion 1*c*. The first straight portion 1*b* corresponds to a right side of the glass plate 1 formed into a substantially rectangular shape. The second straight portion 1*c* corresponds to a lower side of the glass plate 1 formed into the substantially rectangular shape. The third straight portion 1*d* corresponds to an upper side of the glass plate 1 formed into the substantially rectangular shape. One example of the resin molding 2 includes a corner 21*a*. The corner 21*a* of the resin molding 2 is arranged at the corner 1*a* of the glass plate 1.

The design member 3 covers the corner 21*a* of the resin molding 2. One example of the design member 3 shown in FIG. 1 further covers a region of the resin molding 2 that covers the corner 1*a*, the first straight portion 1*b*, the second straight portion 1*c*, and the third straight portion 1*d*. The design member 3 is made of a metal material molded by pressing, extruding, drawing or the like. Examples of the metal material may include iron, aluminum, or alloys thereof. Examples of the iron alloy may include steel and more specifically, stainless steel. The design member 3 may be a member that demonstrates the design property, and may have a wide variety of shapes, patterns, colors, or combinations of these.

As shown in FIGS. 3 and 4, the design member 3 includes a main body 3*a* and an inner edge portion 3*b*. The main body 3*a* covers at least part of the outside of the corner 21*a* of the resin molding 2. The inner edge portion 3*b* extends from the main body 3*a* toward the glass plate 1 and is inserted into the resin molding 2. A distance L3 between the design member 3 and the glass plate 1 is 3 mm or more and 30 mm or less, and is preferably 10 mm or more and 20 mm or less.

Here, description is given of a method for setting a length L3*b* from the outside to the inside of the corner 1*a* at the inner edge portion 3*b* shown in FIG. 4.

When the design member 3 is shaped, and cracking or distortion occurs at the inner edge portion 3*b*, the cracking or distortion may affect the design property of the design member 3. When the angle of the corner 1*a* is low or the length L3*b* is prolonged, cracking or distortion is more likely to occur at the inner edge portion 3*b*. Therefore, the length L3*b* may be set to be short as appropriate so that the design member 3 secures the design property required as the window glass for a vehicle window 10. On the other hand, when the length of L3*b* is 1.5 mm or more, the inner edge portion 3*b* is sufficiently embedded in the resin molding 2, which makes it possible to suppress the occurrence of warpage in the design member 3. The length L3*b* is preferably 1.5 mm or more and 7 mm or less, and is more preferably 2 mm or more and 5 mm or less.

The resin molding 2 includes a main body 2*a* and an exposed portion 2*b*. The main body 2*a* is arranged more outside of the corner 21*a* of the resin molding 2 (in the x-axis negative direction in this case) than the inner edge portion 3*b* of the design member 3. The main body 2*a* is covered with the design member 3. The exposed portion 2*b* is continuous to the main body 2*a*. The exposed portion 2*b* is arranged more inside of the corner 21*a* of the resin molding 2 (in the x-axis positive direction in this case) than the inner edge portion 3*b* of the design member 3. The exposed portion 2*b* is exposed to the outside of the vehicle from the design member 3.

As shown in FIG. 3, the exposed portion 2*b* according to the first embodiment includes a first extension portion 2*c* and a second extension portion 2*d*. The first extension portion 2*c* extends from one end of the corner 1*a* of the glass plate 1 toward the first straight portion 1*b*. The second extension portion 2*d* extends from another end of the corner 1*a* of the glass plate 1 toward the second straight portion 1*c*. A length L1 of the first extension portion 2*c* extending from one end of the corner 1*a* of the glass plate 1 toward the first straight portion 1*b*, and a length L2 of the second extension portion 2*d* extending from the another end of the corner 1*a* of the glass plate 1 toward the second straight portion 1*c* are, for example, 20 mm or more and 40 mm or less, and preferably 25 mm or more and 35 mm or less.

The insert member 4 is provided inside the corner 21*a* of the resin molding 2. As shown in FIG. 2, the insert member 4 according to the first embodiment may curve and extend along the corner 1*a* of the glass plate 1 and be arranged at at least part of the corner 1*a* of the glass plate 1. Example of the material of the insert member 4 may include polyvinyl chloride or polypropylene (PP). In addition, a thickness t4 of the insert member 4 according to the first embodiment is larger than a distance L13 from the glass plate 1 to the inner edge portion 3*b* of the design member 3. The thickness t4 of the insert member 4 according to the first embodiment may also be larger than a thickness t2*b* of the exposed portion 2*b*. The insert member 4 according to the first embodiment is arranged on the glass plate 1 to wrap a tip 1*aa* of the corner 1*a* of the glass plate 1.

Thus, according to the configuration of the window glass for a vehicle window 10, the length L3*b* of the inner edge portion 3*b* of the design member 3 from the outside to the inside of the corner 1*a* is so set that the design member 3 secures the design property required as the window glass for a vehicle window 10. In addition, the insert member 4 is provided inside the resin molding 2. This makes it possible to suppress generation of sink marks in the resin molding 2 while securing the design property of the design member 3.

According to the configuration of the window glass for a vehicle window 10 in the first embodiment, the thickness t4 of the insert member 4 is larger than the distance L13 from the glass plate 1 to the inner edge portion 3*b* of the design member 3. The thickness t4 of the insert member 4 is also larger than the thickness t2*b* of the exposed portion 2*b*. As a result, since the thickness t4 of the insert member 4 is sufficiently large, it is possible to further suppress the generation of sink marks in the resin molding 2.

According to the configuration of the window glass for a vehicle window 10 in the first embodiment, the length L1 of the first extension portion 2*c* extending from one end of the corner 1*a* toward the first straight portion 1*b* and the length L2 of the second extension portion 2*d* extending from another end of the corner 1*a* toward the second straight portion 1*c* are 20 mm or more and 40 mm or less. Therefore, when the design member 3 is shaped, cracking or distortion hardly occurs at the inner edge portion 3*b*. This makes it possible to further secure the design property by the design member 3.

According to the configuration of the window glass for a vehicle window 10 in the first embodiment, the insert member 4 is arranged on the glass plate 1 to wrap the tip 1*aa* of the corner 1*a* of the glass plate 1. Since the insert member 4 is firmly fixed to the corner 1*a* of the glass plate 1, the generation of the sink marks in the resin molding 2 can be more reliably suppressed.

Second Embodiment

Figure 5:
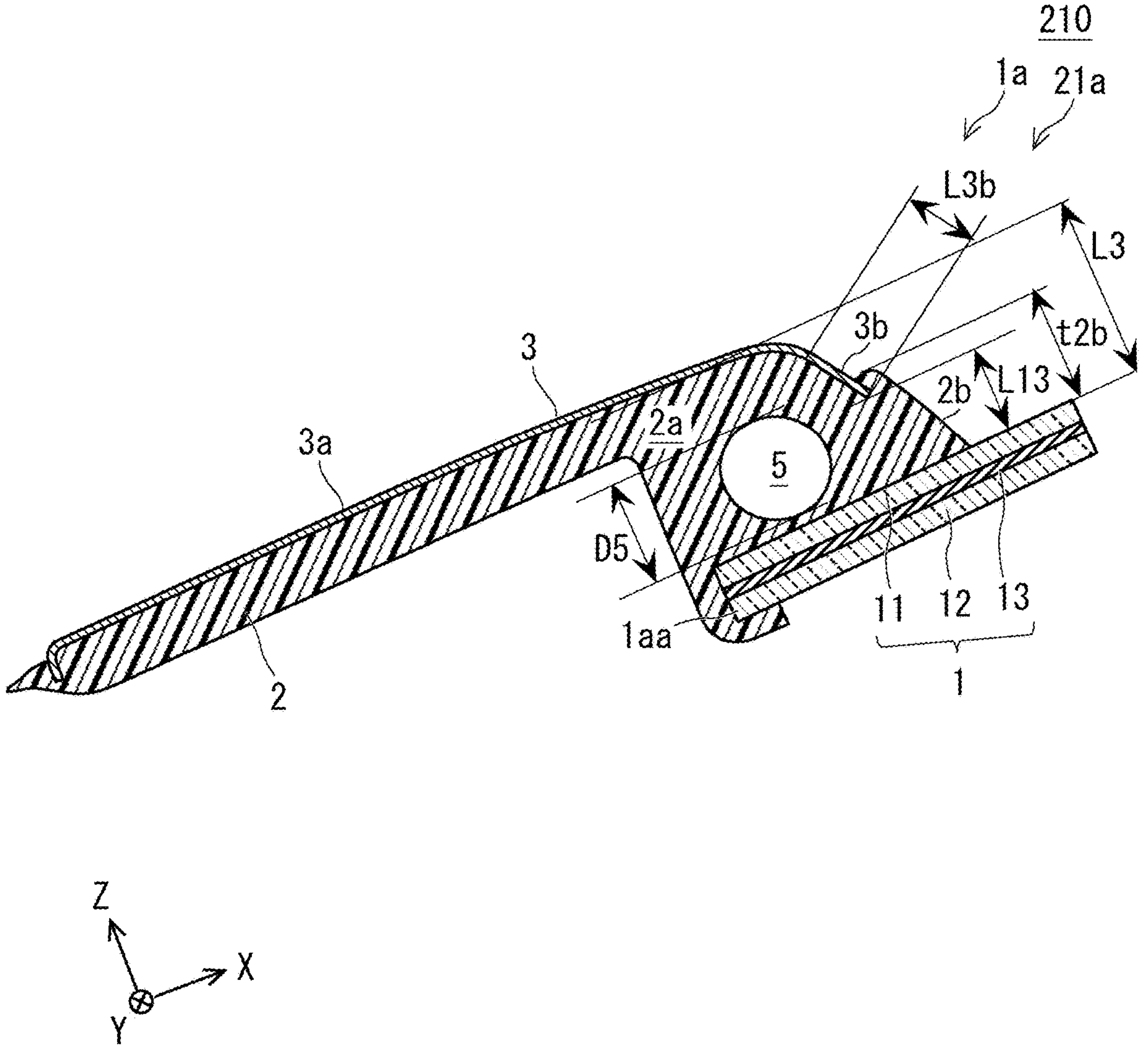
FIG. 5 is a sectional view of a corner in one configuration example of the window glass for a vehicle window according to a second embodiment.
Figure 6:
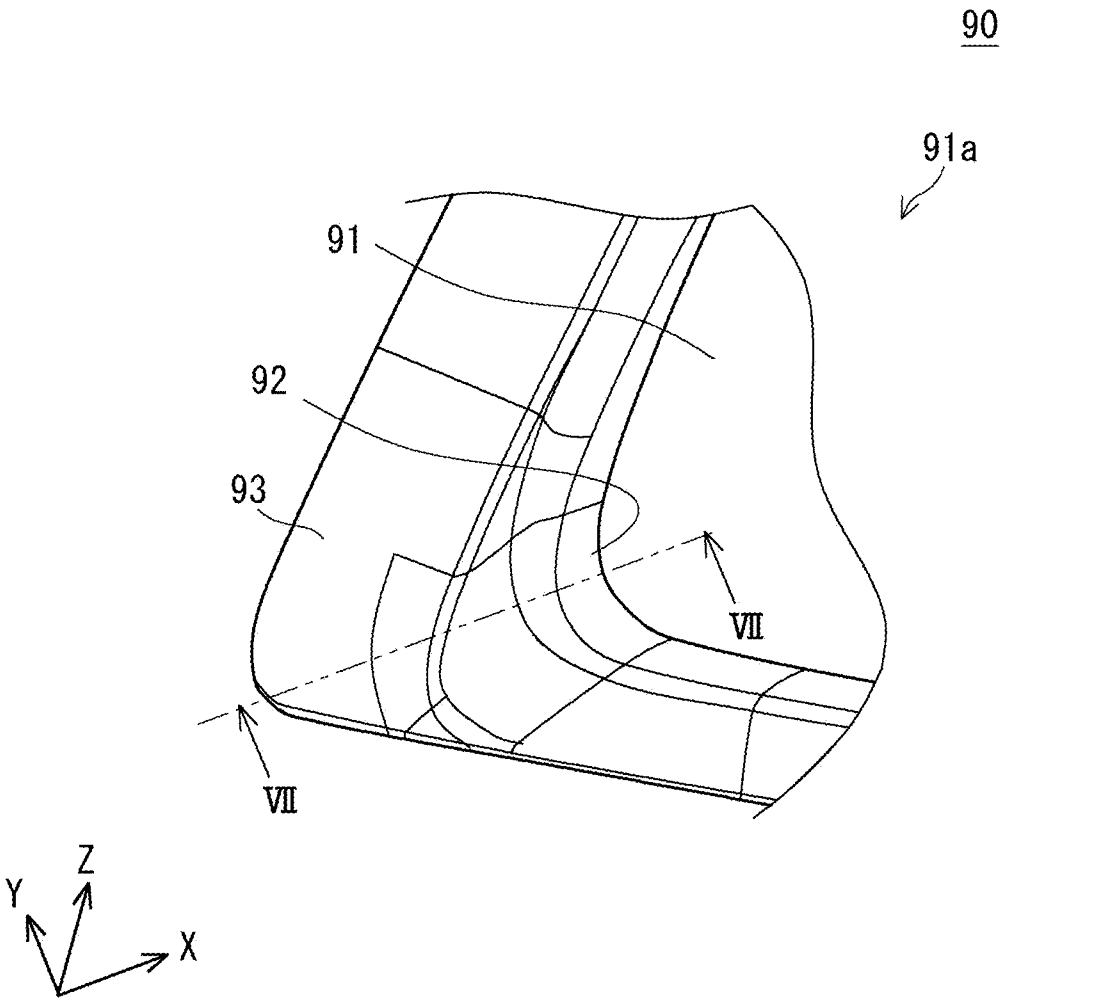
FIG. 6 is a perspective view of a corner in one example of a conventional window glass for a vehicle window.
Figure 7:
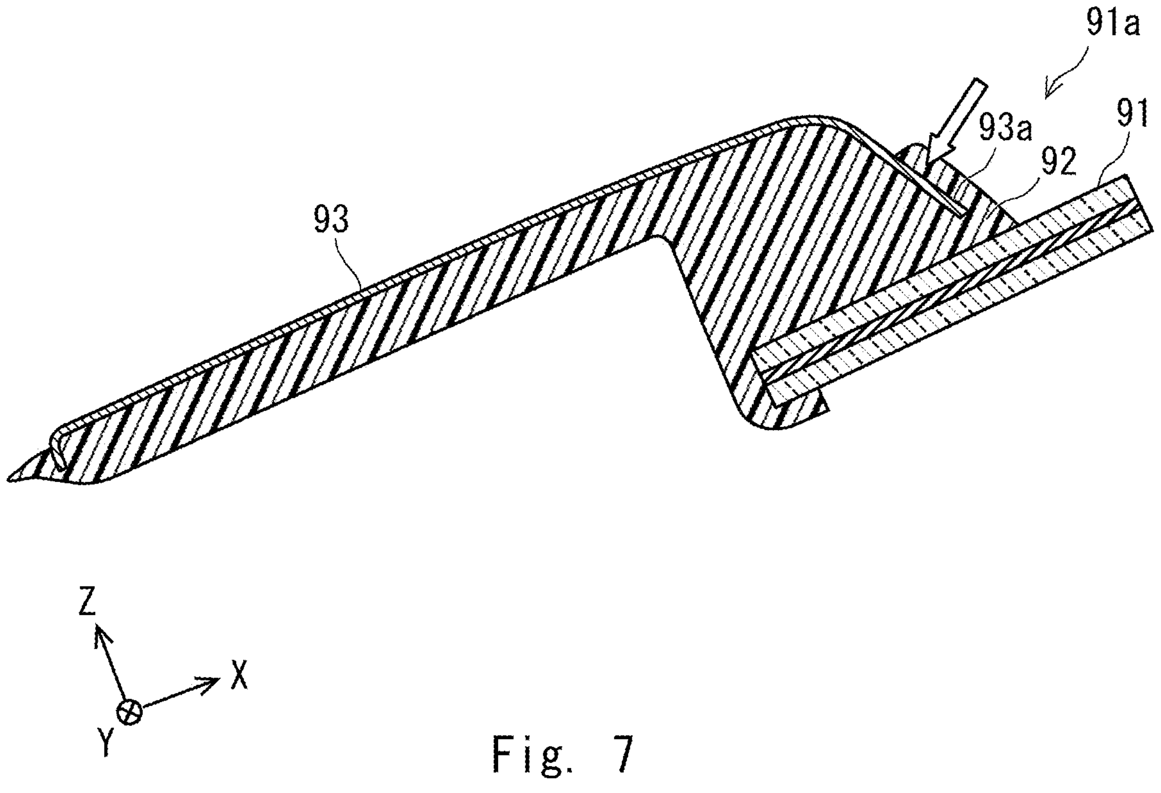
FIG. 7 is a sectional view of a corner taken along a cut line VII-VII in the one example of the conventional window glass for a vehicle window.
Figure 8:
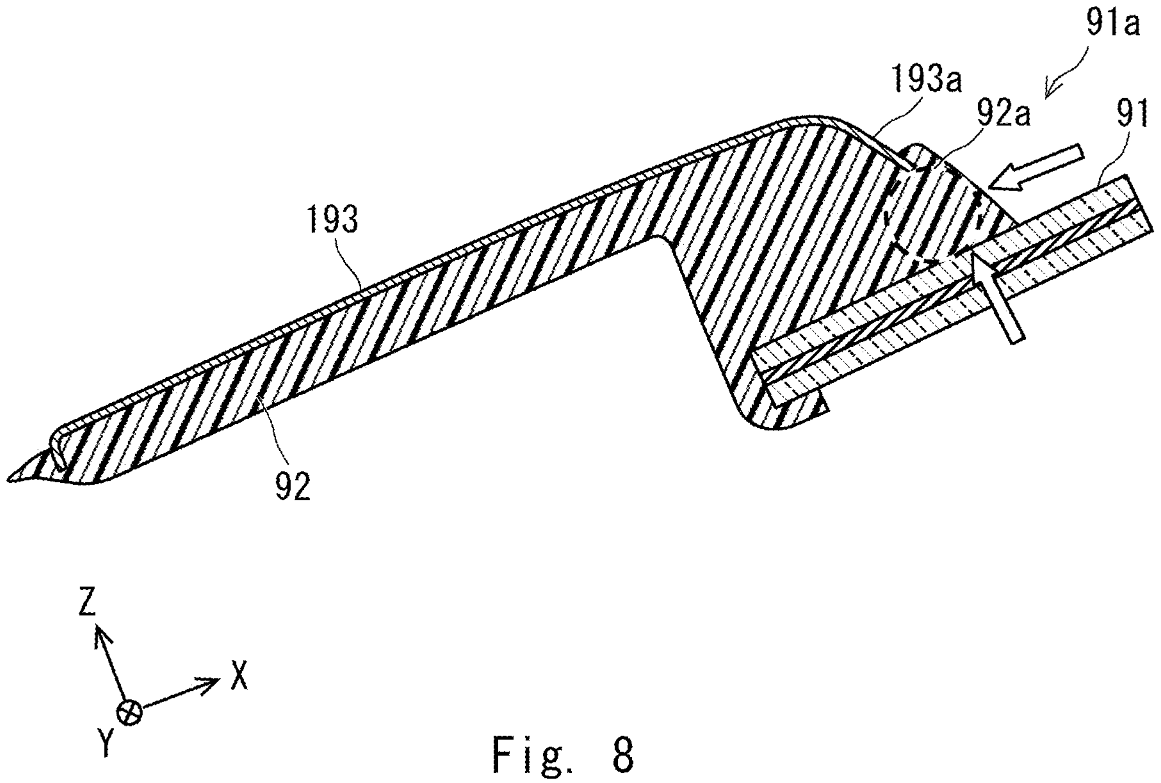
FIG. 8 is a sectional view of a corner in another example of the conventional window glass for a vehicle window.

Next, a second embodiment is described with reference to FIG. 5. FIG. 5 is a front view of one configuration example of a window glass for a vehicle window according to the second embodiment.

A window glass for a vehicle window 210 shown in FIG. 5 includes the same configuration as the window glass for a vehicle window 10 shown in FIG. 1 except that a gas bubble portion 5 is provided.

The gas bubble portion 5 is provided inside the corner 21*a* of the resin molding 2. The gas bubble portion 5 is hollow space that spreads inside the resin molding 2, and the space is filled with gas. Examples of the gas charged in the space may include nitrogen gas, and air. Although the shape of one example of the gas bubble portion 5 shown in FIG. 5 is substantially spherical, the shape of the gas bubble portion 5 is not limited to this, and may widely vary.

The gas bubble portion 5 according to the second embodiment has a diameter D5 that is larger than the distance L13 from the glass plate 1 to the inner edge portion 3*b* of the design member 3. The diameter D5 of the gas bubble portion 5 according to the second embodiment is also larger than the thickness t2*b* of the exposed portion 2*b*.

The resin molding 2 of the window glass for a vehicle window 210 may be provided around the glass plate 1 by mounting the glass plate 1 to a mold having a cavity corresponding to the shape of the resin molding 2 and injecting the above synthetic resin (melted synthetic resin) into the cavity. At the time of the injection or immediately after the injection, gas may be sprayed to the above-mentioned synthetic resin to form the gas bubble portion 5. Specifically, the gas may be made to pass through a nozzle provided inside the mold and be sprayed into the above-mentioned synthetic resin. It is also possible to use gas-assisted molding. The resin molding 2 and the gas bubble portion 5, which are integrally formed separately from the glass plate 1, may be fitted to the outer periphery of the glass plate 1.

When the resin molding 2 is obtained as an integrated article by injection molding performed around a peripheral edge portion of the glass plate 1, the window glass for a vehicle window 10 may be an integrated article made by integrally molding the glass plate 1, the resin molding 2, the design member 3, and the gas bubble portion 5, or a separately prepared design member 3 may be attached to the window glass for a vehicle window 10.

Thus, according to the configuration of the window glass for a vehicle window 210, the length of the inner edge portion 3*b* from the inner edge portion of the main body 3*a* to the inside of the corner 1*a* is so set that the design member 3 secures the design property required as the window glass for a vehicle window 210, as in the case of the window glass for a vehicle window 10. In addition, the gas bubble portion 5 is provided inside the resin molding 2. This makes it possible to suppress generation of sink marks in the resin molding 2 while securing the design property of the design member 3.

According to the configuration of the window glass for a vehicle window 210 in the second embodiment, the diameter D5 of the gas bubble portion 5 is larger than the distance L13 from the glass plate 1 to the inner edge portion 3*b* of the design member 3. The diameter D5 of the gas bubble portion 5 according to the second embodiment is also larger than the thickness t2*b* of the exposed portion 2*b*. As a result, since the diameter D5 of the gas bubble portion 5 is sufficiently large, it is possible to further suppress the generation of sink marks in the resin molding 2.

It is to be noted that the present invention is not limited to the first and the second embodiments, and appropriate modifications may be made without departing from the scope of the present invention. Moreover, the present invention may be implemented by appropriately combining the first and the second embodiments, or the examples thereof. For example, the window glass for a vehicle window 210 according to the second embodiment may be appropriately combined with each configuration member of the window glass for a vehicle window 10.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A window glass for a vehicle window, comprising:

a glass plate; and a resin molding provided in a peripheral edge portion of the glass plate, the glass plate and the resin molding constituting an integrated article, the window glass for a vehicle window further comprising a design member that covers a corner of the resin molding, wherein the design member is arranged at a vehicle outside of the resin molding when the window glass for a vehicle window is attached to a vehicle, the corner has a sharp angle, and an insert member or a gas bubble portion is provided inside the corner of the resin molding.

2. The window glass for a vehicle window according to claim 1, wherein the design member includes an inner edge portion extending toward the glass plate and inserted into the resin molding, the resin molding includes a main body that is arranged more outside of the corner of the resin molding than the inner edge portion and is covered with the design member, and an exposed portion that is arranged more inside of the corner of the resin molding than the inner edge portion and is exposed, and a thickness of the insert member or a diameter of the gas bubble portion is larger than a distance from the glass plate to the inner edge portion of the design member.

3. The window glass for a vehicle window according to claim 2, wherein the thickness of the insert member or the diameter of the gas bubble portion is larger than a thickness of the exposed portion.

4. The window glass for a vehicle window according to claim 2, wherein the glass plate includes a first straight portion, a second straight portion, and a corner formed by intersection of the first straight portion and the second straight portion, the exposed portion of the resin molding includes a first extension portion extending from one end of the corner of the glass plate toward the first straight portion, and a second extension portion extending from another end of the corner of the glass plate toward the second straight portion, and a length of the first extension portion extending from the one end of the corner of the glass plate toward the first straight portion and a length of the second extension portion extending from the another end of the corner of the glass plate toward the second straight portion are 20 mm to 40 mm.

5. The window glass for a vehicle window according to claim 4, wherein the insert member is arranged on the glass plate and wraps a tip of the corner of the glass plate.

6. The window glass for a vehicle window according to claim 2, wherein the gas bubble portion is provided inside the main body of the resin molding.

7. The window glass for a vehicle window according to claim 1, wherein the insert member includes polyvinyl chloride or polypropylene.

8. The window glass for a vehicle window according to claim 1, wherein the gas bubble portion includes nitrogen gas.

9. The window glass for a vehicle window according to claim 1, wherein the glass plate, the resin molding, and the insert member constitute an integrated article, or the glass plate, the resin molding, and the gas bubble portion constitute an integrated article.

10. The window glass for a vehicle window according to claim 1, wherein the glass plate, the resin molding, the design member, and the insert member constitute an integrated article, or the glass plate, the resin molding, the design member, and the gas bubble portion constitute an integrated article.

* * * * *